United States Patent
Betin

(10) Patent No.: US 6,278,547 B1
(45) Date of Patent: Aug. 21, 2001

(54) POLARIZATION INSENSITIVE FARADAY ATTENUATOR

(75) Inventor: Alexander A. Betin, Calabasas, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/073,706

(22) Filed: May 6, 1998

(51) Int. Cl.$^7$ ............................... G02B 5/30; G02F 1/09
(52) U.S. Cl. ............ 359/484; 359/495; 359/496; 359/497; 359/281; 359/282
(58) Field of Search ................. 359/484, 495, 359/496, 497, 281, 282; 385/11, 24; 372/703

(56) References Cited

U.S. PATENT DOCUMENTS

| | | | |
|---|---|---|---|
| 4,272,159 | * 6/1981 | Matsumoto | 359/484 |
| 4,702,557 | * 10/1987 | Beckmann et al. | |
| 4,712,880 | * 12/1987 | Shirasaki | 359/484 |
| 5,204,923 | * 4/1993 | Grasso et al. | 385/24 |
| 5,402,509 | * 3/1995 | Fukushima | 385/11 |
| 5,440,424 | * 8/1995 | Wu et al. | 359/497 |
| 5,546,219 | * 8/1996 | Iida | 359/281 |
| 5,579,420 | * 11/1996 | Fukushima | 385/11 |
| 5,631,771 | * 5/1997 | Swan | 359/484 |
| 5,726,795 | 3/1998 | Betin et al. | 359/300 |
| 5,729,380 | 3/1998 | Betin et al. | 359/300 |
| 5,982,539 | * 11/1999 | Shirasaki | 359/484 |

FOREIGN PATENT DOCUMENTS

| | | | |
|---|---|---|---|
| 54-159245 | * 12/1979 | (JP) | 359/484 |
| 58-16515 | * 7/1983 | (JP) | 359/484 |
| 60-130934 | * 7/1985 | (JP) | 359/484 |
| 61-122624 | * 6/1986 | (JP) | 359/484 |
| 404366806 | * 12/1992 | (JP) | 359/496 |
| 6-34915 | * 2/1994 | (JP) | 359/484 |

OTHER PUBLICATIONS

Shirasaki et al; "A Compact Polarization–Independent Optical Circulator"; The Transactions of The IECE of Japan; vol. E 64; No. 1; Jan. 1981; pp 30–31.*

G. E. Lano and C. Pinyan, "Optical isolators direct light the right way," Laser Focus World, Jul., 1995, p. 125.

R. Wynalds, F. Diedrich, D. Meschede and H. R. Telle, "A compact turntable 60–dB Faraday optical isolator for near infrared," Rev. Sci. Instrum., 1992, vol. 63, No. 12, p. 5586.

W. Keochner, Solid–State Laser Engineering, Springer–Verlag, 1992, p. 140.

M.S. Barashkov et al., "Strong reflection of a series of pulses from a four–wave mirror with thermal nonlinearity under parametric feedback conditions," Sov. J. Quantum Electron., 19(4), p. 518 (1989).

T. Matasumoto, "Polarization–Independent Isolators for Fiber Optics," Transactions of the IECE of Japan, vol. E62, No. 7, p.516 (1979).

(List continued on next page.)

Primary Examiner—Ricky D. Shafer
(74) Attorney, Agent, or Firm—V. D. Duraiswamy; M. W. Sales

(57) ABSTRACT

A polarization insensitive optical attenuator is disclosed. Three birefringent wedges are disposed along an optical path with their respective optical axes aligned. The apex angle of the second wedge equals the sum the apex angles of the first and third wedges. A Faraday rotator is disposed along the optical path between the first and the second wedge. A reciprocal rotator is disposed along the optical path adjacent to the Faraday rotator. An optical signal transmitted through the attenuator may be selectively divided into three spatially separate output rays while maintaining a predetermined attenuation or substantially complete isolation from reflected signals. Adjustment of the optical rotation angles allows the attenuator to be easily adapted to a wide variety of industrial and commercial laser applications.

11 Claims, 5 Drawing Sheets

OTHER PUBLICATIONS

M. Shirasaki and K. Asama, "Compact optical isolator for fibers using birefringent wedges," Applied Optics, vol. 21, No. 23, p. 4296 (1982).

K. W. Chang and W. V. Sorin, "Polarization independent isolator using spatial walkoff polarizers," IEEE Photonics Technology Letters, vol. 1, No. 3, p. 68 (1989).

A. A. Betin, S. C. Matthews, and M. S. Mangir, "Vector phase conjugation with loop laser geometry," C:EO'97, Baltimore, May, 1997, Proc. P. 102.

A. A. Betin, S. C. Matthews, and M. S. Mangir, "1-ms-long pulse Nd: YAG laser with loop PCM," CLEO'97, Baltimore, May, 1997, Proc. P. 283.

M. Shirasaki et. Al., "Optical isolator for single mode fiber," Proceedings on European Conference on Optical Communcation, Barcelona, 1986, vol. 2, p. 11.

K. Shiraishi and S. Kawakami, "Cascaded optical isolator configuration having high-isolation characteristics over a wide temperature and wavelength range," Opt. Letters, vol. 12, No. 7, p. 462 (1987).

K. W. Chang and W. V. Sorin, "High-perfornace single-mode fiber polarization-independent isolators," Opt. Letters, vol. 15, No. 8, p. 449 (1990.

* cited by examiner

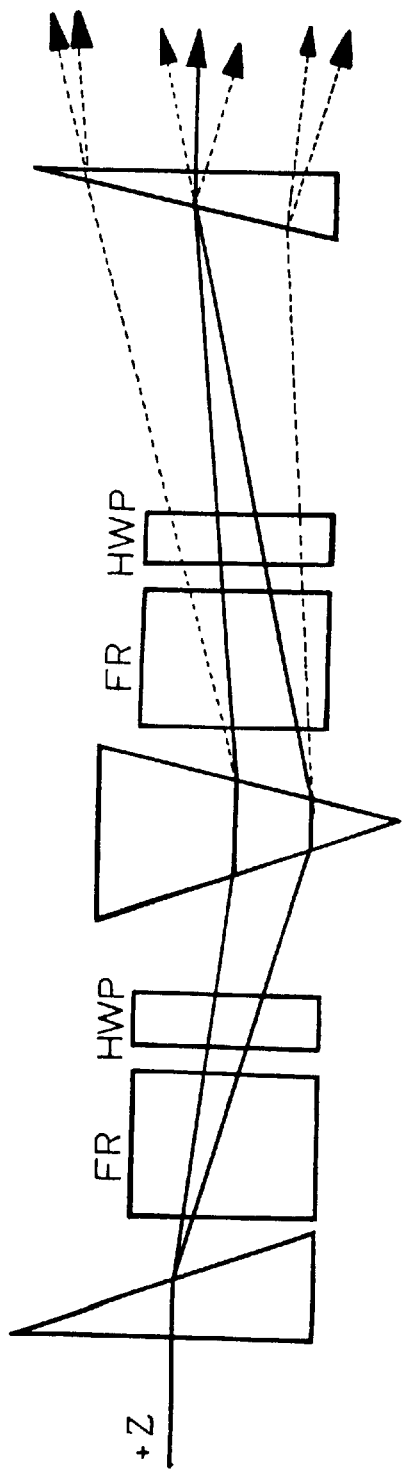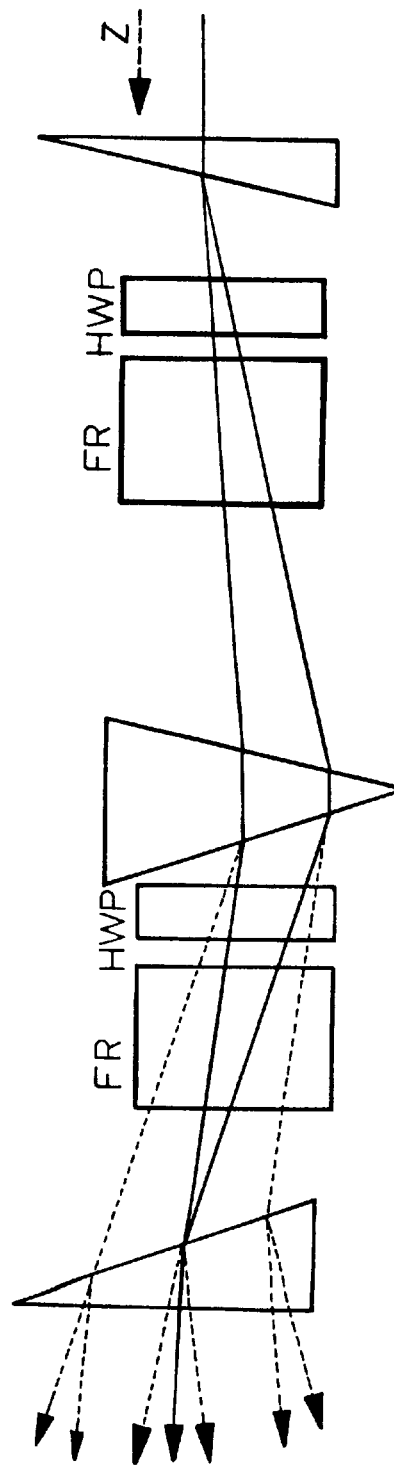

POLARIZATION INSENSITIVE FARADAY ATTENUATOR

This invention was made with Government support under Agreement No. MDA972-94-3-0020 awarded by ARPA. The Government has certain rights in this invention.

BACKGROUND OF THE INVENTION (a) Field of the Invention

The present invention relates generally to a polarization independent optical attenuator. More particularly, it relates to an improved optical attenuator having a tandem arrangement of three birefringent wedges and a Faraday rotator.

(b) Description of Related Art

Optical attenuators or isolators are generally used to prevent the reflected portions of an optical transmission from re-entering the transmitting device. Optical attenuation may be used to improve the quality of an optical beam, or to prevent damage to the transmitting device. Solid state laser systems, for example, depend on optical attenuation to improve beam quality and to prevent reflected output from seriously damaging the elements generating the laser output.

A variety of optical attenuators comprising a non-reciprocal magneto-optic conduit (such as a Faraday rotator) and polarizers are well-known to those skilled in the art. A Faraday rotator is made from an optically transmissive, magnetically activated conduit. A Faraday rotator imparts a non-reciprocal (absolute) rotation to the polarization vector of an optical or lightwave signal traveling through it. Thus, a lightwave's polarization vector will be rotated in the same direction (i.e. clockwise or counterclockwise) regardless of whether it passes through the Faraday rotator in a forward or a reverse direction. The amount of rotation is a function of the couduit material and geometry, and the intensity and orientation of the applied magnetic field.

A known optical attenuator configuration illustrated in FIG. 1 uses a tandem arrangement of dichroic polarizers and a Faraday Rotator. Linearly polarized light (represented by a solid line) travels in a +z, or forward direction through a dichroic polarizer P1. The changing polarization state of the forward traveling light is represented by a series of arrows surrounded with a solid circle. Ideally, the polarization vector of the incident lightwave is aligned with the polarization direction of polarizer P1 to minimize source attenuation. The lightwave continues through a Faraday rotator FR wherein its polarization vector is rotated 45° clockwise. A second dichroic polarizer P2 is ideally arranged so that its polarization direction matches that of the lightwave after it has traveled through the Faraday rotator. The lightwave then passes through polarizer P2 substantially unattenuated.

A reflected lightwave (represented by a dashed line) traveling in a −z, or reverse direction will easily pass through polarizer P2 because its polarization is substantially identical to that of the lightwave exiting P2. The changing polarization state of the reverse traveling light is represented by a series of arrows surrounded with a dashed circle. Due to the non-reciprocal nature of the Faraday rotator, the lightwave traveling in the reverse direction will have its polarization direction rotated 45° clockwise. As a result, the lightwave traveling in the reverse direction is completely blocked by P1 because its polarization vector is perpendicular to the polarization direction of P1. Thus, the optical isolator configuration of FIG. 1 produces optical isolation by precisely aligning the polarization direction of reflected lightwaves so that they are substantially absorbed (attenuated) by a dichroic polarizer.

The simple optical attenuator configuration of FIG. 1 has several problems. First, incident lightwaves that have a non-linear or arbitrary polarization direction will be significantly attenuated by polarizer P1. Second, high attenuation or isolation of reflected lightwaves is extremely difficult to achieve because accurate rotation of the lightwave's polarization vector requires precise control over a multitude of variables.

The second problem relates to the rotation angle imparted by the Faraday Rotator. The rotation angle that a Faraday rotator imparts to a lightwave traveling through it depends on the material and geometry of the conduit, the intensity and orientation of the applied magnetic field, the conduit's temperature, and the wavelength of the lightwave. Small changes in any of these parameters can cause the lightwave's polarization vector rotation to be more or less than 45°. Deviations from an ideal 45° rotation will result in some tranmission of the reflected lightwave through P1 because its polarization vector will have a non-orthogonal orientation to P1's polarization direction. Isolation performance can be improved by adjusting P1 so that its polarization direction is orthogonal to the reflected lightwave's polarization vector. However, even a linearly polarized source would then be substantially attenuated by P1 as it passed through in the forward direction because the polarization of P1 would be non-orthogonal with respect to it.

Another known attenuator configuration shown in FIG. 2a achieves polarization insensitive isolation using a tandem arrangement of birefringent crystals (P1 and P2), a reciprocal rotator HWP, and a Faraday rotator FR. The birefringent crystals have two polarization dependent indices of refraction. A lightwave traveling through the birefringent crystal splits into two spatially divergent rays (i.e. an ordinary ray and an extraordinary ray) having orthogonal polarization directions. In this way, an arbitrarily polarized lightwave can be entirely resolved into a pair of spatially divergent, orthogonally polarized rays that pass through the crystal substantially unattenuated.

A lightwave traveling in the +z or forward direction enters birefringent crystal P1 and splits into two rays having orthogonal polarization directions. An ordinary ray travels straight through the crystal while an extraordinary ray follows an oblique propagation path through the crystal. Both rays exit the crystal P1 and travel in parallel through the Faraday rotator wherein their polarization vectors are rotated clockwise 45°. The rays next pass through the reciprocal rotator wherein their polarization vectors are rotated clockwise an additional 45°. The polarization directions for both rays have then rotated a total of 90° clockwise. Since crystal P2 is substantially identical to P1, the ordinary ray's polarization direction forces it to follow the oblique propagation path through the crystal P2 and the extraordinary ray now follows a straight path through P2. As a result, the rays converge and recompose the original lightwave as they exit crystal P2.

As shown in FIG. 2b, a reflected lightwave traveling in a −z or reverse direction will retrace the path of the forward traveling ray up through the Faraday rotator. At the output of the Faraday rotator, though, the rays will have polarization directions rotated 90° with respect to those of the forward traveling rays. Consequently, as the rays traveling in the reverse direction pass through P1 they will diverge and thereby avoid the aperture of the optical transmission device. In sum, the optical isolator of FIG. 2a produces optical isolation by causing reflected lightwaves to diverge spatially so that they avoid the aperture of an optical transmission device.

Polarization insensitive optical attenuators similar to that shown in FIG. 2a are not suitable for use with large diameter optical beams (e.g. high-powered laser systems). With the configuration shown in FIG. 2a, the birefringent crystals have a parallel plate geometry. For this geometry, the spacial separation of the two rays is primarily a function of the plate thickness. As a result, an optical beam having a diameter greater than approximately 3 mm cannot be sufficiently separated into two distinct rays given the practical limitations on plate thickness.

Other known optical attenuators have modified the geometry of the birefringent crystals to be that of a wedge shape. One example of such an attenuator is shown in FIG. 2c and FIG. 2d. A wedge geometry allows for a greater degree of spacial separation between the ordinary and extraordinary rays. By properly orientating the optical axis of a birefringent wedge the orthogonal components travel at different rates along parallel propagation paths through the body of the crystal. As the orthogonal components exit a beveled surface of a wedge shaped crystal they diverge at different angles because the indices of refraction for the two polarization directions are different. Thus, greater spacial separation can be achieved between the two rays by increasing the path length through the optical attenuator.

The above approaches using birefringent wedges cannot be easily integrated into systems having large or high-powered optical beams because the spatially separated orthogonal rays must be recombined using a focusing lens that cannot be readily incorporated into apertures of high powered optical equipment such as laser amplifiers. Accordingly, there is a need for an improved polarization insensitive optical isolator that can be easily adapted for use with high-powered optical systems.

SUMMARY OF THE INVENTION

The present invention may be embodied in an optical attenuator comprising three birefringent wedges arranged in tandem along an optical path. A Faraday rotator is disposed along the optical path between the first and second wedge. A reciprocal rotator is disposed along the optical path and is adjacent to the Faraday rotator. The optical axes of the three wedges are approximately parallel, and the apex angle of the second wedge equals the sum of the apex angles of the first and third wedge.

The present invention may also be embodied in yet another optical attenuator comprising three birefringent wedges arranged in tandem along an optical path. A Faraday rotator is disposed along the optical path between the first and second wedge. A reciprocal rotator is disposed along the optical path and is adjacent to the Faraday rotator. A second Faraday rotator is disposed along the optical path between the second and third wedges. A second reciprocal rotator is disposed along the optical path adjacent to the second Faraday rotator. The optical axes of the three wedges are approximately parallel, and the apex angle of the second wedge equals the sum of the apex angles of the first and third wedge.

The invention itself, together with further objects and attendant advantages, will best be understood by reference to the following detailed description, taken in conjunction with the accompanying drawings.

BRIEF DESCRIPTION OF THE DRAWINGS

FIG. 5 is a functional diagram showing the propagation of an optical signal through a second embodiment of the present invention;

FIG. 6 is a functional diagram showing the propagation of an optical reflection through the second embodiment of the present invention.

DESCRIPTION OF THE PREFERRED EMBODIMENTS

A variety of polarization insensitive optical attenuators have been successfully applied to low power optical transmission systems (e.g. fiber optic transmission networks). However, these existing attenuators are not practicable for use in high power optical systems because they cannot provide sufficient spatial separation of large diameter optical beams, and they are difficult to integrate within high-powered optical transmitters. The present invention overcomes these problems by using a tandem arrangement of three birefringent crystals that have a predetermined wedge shaped geometry.

Figure 1:
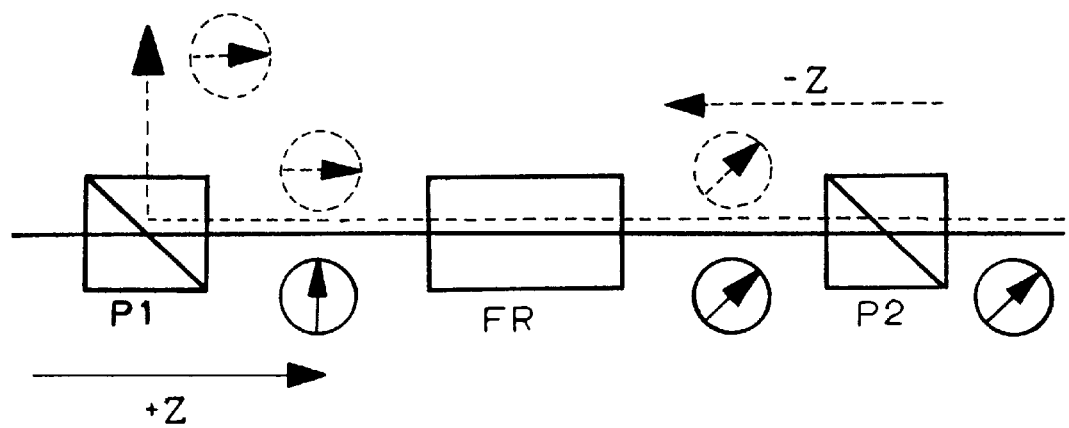
FIG. 1 is a functional diagram depicting the principal of operation of a known Faraday attenuator.
Figure 2A:
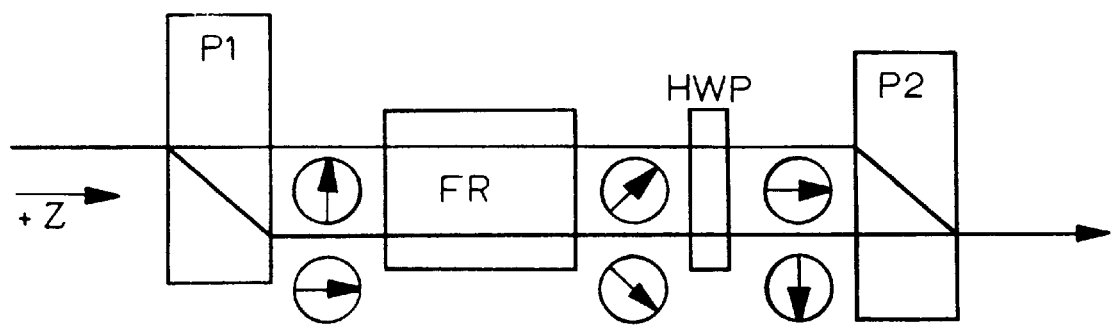
FIGS. 2a, 2b, 2c, and 2d are functional diagrams depicting the principal of operation of known polarization insensitive Faraday attenuators.
Figure 2B:
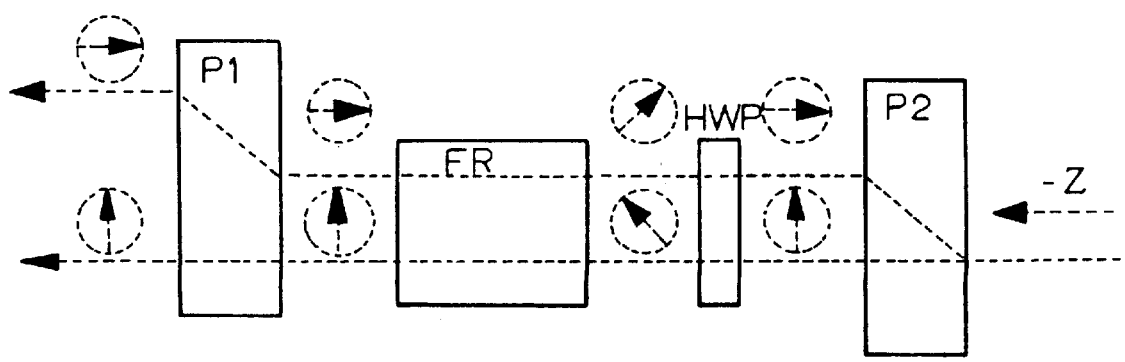
Figure 2C:
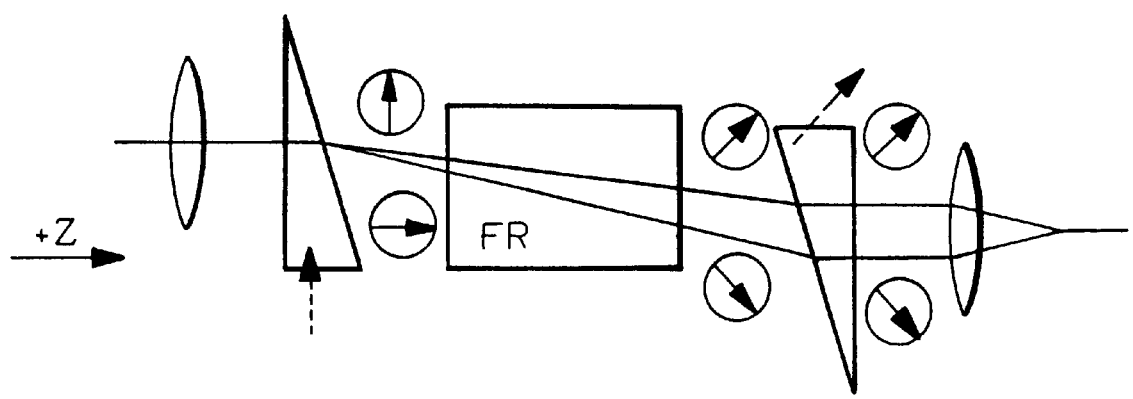
Figure 2D:
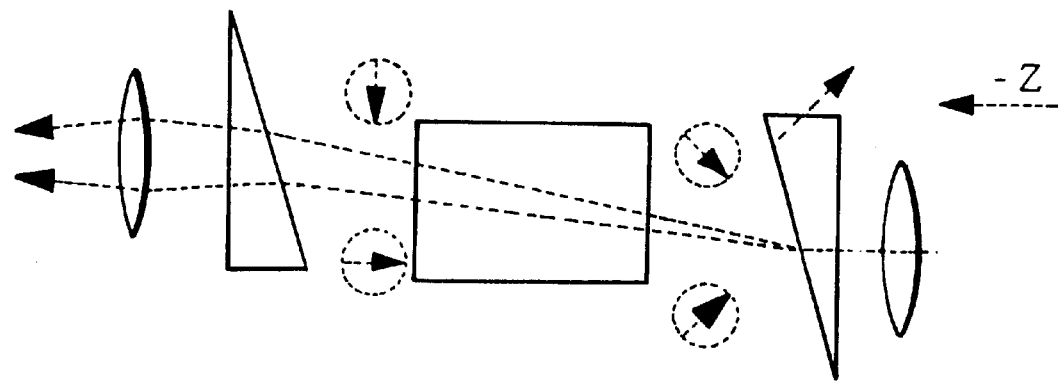
Figure 3:
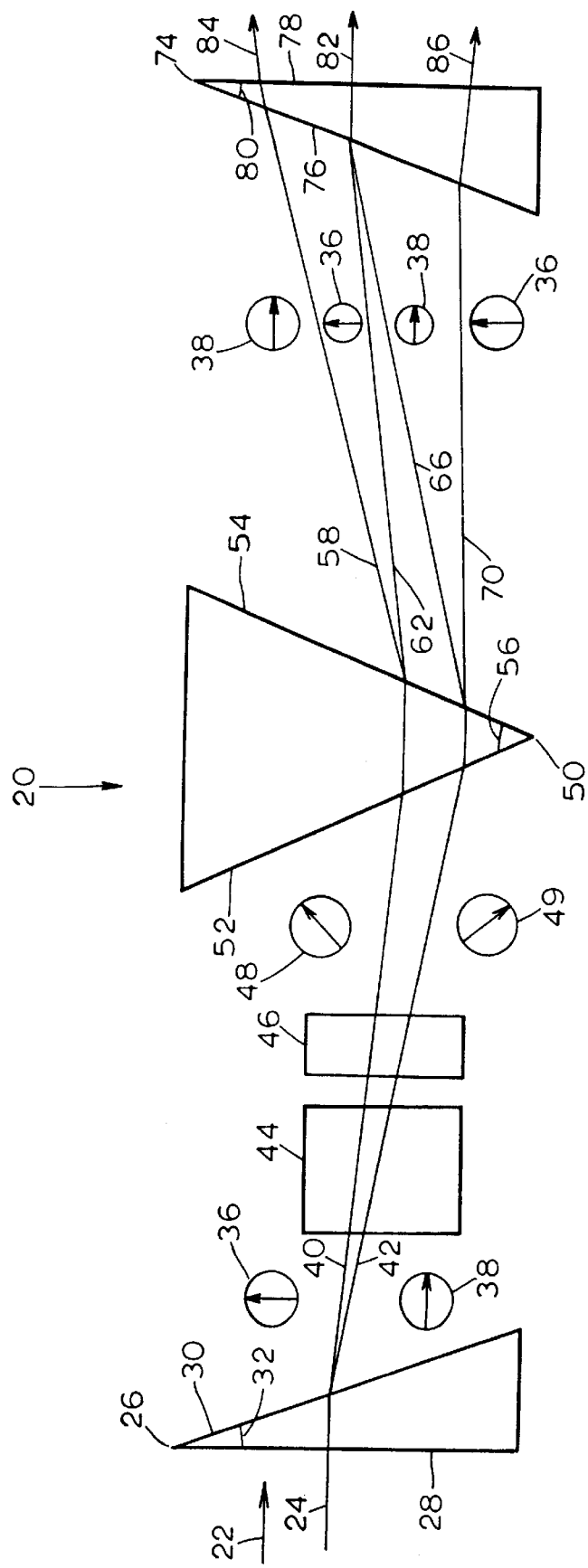
FIG. 3 is a functional diagram showing the propagation of an optical transmission through a first embodiment of the present invention.

Illustrated in FIG. 3 is a polarization insensitive optical attenuator 20 embodying the present invention. The attenuator 20 comprises a first birefringent wedge 26, a second birefringent wedge 50, a third birefringent wedge 74, a non-reciprocal rotator or Faraday rotator 44, and a reciprocal rotator or half wave plate 46.

The first wedge 26, the second wedge 50, and the third wedge 74 are arranged along an optical path so that the second wedge 50 is disposed at a predetermined point between the first wedge 26 and the third wedge 74. Precise positioning of the second wedge is explained more fully below. The Faraday rotator 44 and the half wave plate 46 are adjacent to each other and are disposed along the optical path between the first wedge 26 and the second wedge 50.

The first wedge 26 has a first entrance surface 28 and a first exit surface 30. The first exit surface 30 is inclined through a first apex angle 32 from the first entrance surface 28. The second wedge 50 has a second entrance surface 52 and a second exit surface 54. The second exit surface 54 is inclined at a second apex angle 56 from the second entrance surface 52. The third wedge 74 has a third entrance surface 76 and a third exit surface 78. The third entrance surface 76 is inclined at a third apex angle 80 from the third exit surface 78.

For illustration purposes, the first exit surface 30 of the first wedge 26 faces and is parallel to the second entrance surface 52 of the second wedge 50. Similarly, the second exit surface 54 of the second wedge 50 faces and is parallel to the third entrance surface 76 of the third wedge 74. Thus, the second apex angle 56 equals the sum of the first apex angle 32 and the third apex angle 80. In practice, proper operation of the attenuator 20 requires that the second apex angle 56 equals the sum of the first apex angle 32 and the third apex angle 80, but does not require that the surface 30 is parallel to the surface 52 or that the surface 54 is parallel to the surface 76. A non-parallel condition between these surfaces results in a more complex optical path, but does not degrade performance.

For apex angles of less than 30°, the distances between the wedges are inversely ratiometric to the apex angles of the first and third wedges. Thus, the distance between the first wedge 26 and the second wedge 50 divided by the distance between the second wedge 50 and the third wedge 74 approximately equals the third apex angle 80 divided by the first apex angle 32. For example, if the first apex angle 32 equals the third apex angle 80, then the second wedge 50 would lie equidistant from the first wedge 26 and the third wedge 74. Alternatively, the Fresnel formula for refraction may be used to more precisely calculate optimal wedge placement for all wedge apex angles. However, this method is more cumbersome than the approximation method described above, and is generally not necessary to produce a satisfactory result. As will be described in greater detail below, the first apex angle 32 of the first wedge 26, and the second apex angle 56 of the second wedge may be selected to vary the characteristics of the optical path that a lightwave will along in the attenuator 20.

The first wedge 26, the second wedge 50, and the third wedge 74 are all preferably made from a birefringent crystalline material. For example, calcite and rutile are two birefringent crystalline materials that are often used in optical isolators. Additionally, all three wedges are oriented along the optical path so that their optical axes are substantially parallel.

The Faraday rotator 44 is disposed along the optical path between the first wedge 26 and the second wedge 50. Alternatively, the Faraday rotator 44 may be disposed along the optical path between the second wedge 50 and the third wedge 74. Faraday rotators are well-known to those skilled in the art, and may be made from a permanent magnet surrounding a single crystal magneto-optical material such as rare-earth bismuth iron garnet, terbium gallium garnet, yttrium gallium garnet (YIG), or cadmium manganese telluride (CMT). The half-wave plate 46 is disposed along the optical path adjacent to the Faraday rotator 44. The half-wave plate may be made from a birefringent or an optically active material such as quartz.

In operation, an optical signal or lightwave 24 with arbitrary polarization propagates in a forward direction 22 and impinges on the first entrance surface 28 of the first wedge 26. Although FIG. 3 shows the lightwave 24 impinging perpendicularly on the first entrance surface 28, this is not required for proper operation of the attenuator 20. Lightwave 24 travels through the body and out the first exit surface 30 of the first wedge 26 As lightwave 24 crosses the first exit surface 30, it separates into a first light ray 40, having a first polarization vector 36, and a second light ray 42 having a second orthogonal polarization vector 38. Thus, the lightwave wave 24 has been resolved into a pair of orthogonally polarized components. The first polarization vector 36 and the second polarization vector 38 are further related to the optical axis of the first wedge 26 so that a change in the orientation of the optical axis will produce a corresponding change in the orthogonal polarization vectors 36 and 38. As noted above, the optical axes for the three wedges 26, 50, and 74 are preferably parallel.

Since the first wedge 26 is made from a birefringent crystal it has two indices of refraction, one for each of the first and second orthogonal polarization directions 36 and 38. The separation angle between the first ray 40 and the second ray 42 equals the difference between the two indices of refraction multiplied by the first apex angle 32.

The rays 40 and 42 travel through Faraday rotator 44 and the half wave plate 46. The rotator 44 imparts a rotation angle $\theta_F$, and the half wave plate 46 imparts a rotation angle $\theta_H$ to the polarization vectors of both rays. The total rotation imparted equals the sum of the imparted rotation angles ($\theta_F + \theta_H$). After exiting the half wave plate 46 the first ray 40 has a third polarization vector 48 and the second ray 42 has a fourth polarization vector 49. Since the optical axis of the second wedge 50 is parallel to the optical axis of the first wedge 26, the second wedge will resolve all incident lightrays into separate rays aligned with the first and second polarization vectors 36 and 38. Thus, because the third and fourth polarization vectors 48 and 49 each contain polarization components in the direction of the first and second polarization vectors 36 and 38, the rays 40 and 42 will each be resolved into a pair of spatially separate, orthogonally polarized rays after passing through the second wedge 50.

The ray 40 impinges on the second entrance surface 52 of the second wedge 50. The ray 40 travels though the body of the second wedge 50 and out the second exit surface 54. As the ray 40 crosses the second exit surface 54 the birefringent property of the second wedge 50 causes the first ray 40 to separate into a third light ray 62 having the first polarization vector 36, and a fourth light ray 58 having the second polarization vector 38 Similarly, the second ray 42 separates into a fifth light ray 66 having a the second polarization vector 38, and a sixth light ray 70 having the first polarization vector 36.

The third and fifth rays 62 and 66 converge and become collinear at the third entrance surface 76 of the third wedge 74 and emerge at the third exit surface 78 as a direct output ray 82 While the general positioning of the three wedges along the optical path is determined using the relationships between apex angles discussed above, the location of the third wedge 74 may be further adjusted so that the convergence of the third and fifth rays 62 and 66 occurs more precisely at the entrance surface 76.

The fourth and sixth rays 58 and 70 diverge and pass through the third wedge 74 substantially separate from the direct output ray 82 and become an upper output ray 84 and a lower output ray 86 respectively. The distance between the upper ray 84 (or the lower ray 86) and the direct output ray 82 equals the distance between the second wedge 50 and the third wedge 74 multiplied by the second apex angle 56 and the difference between the two refractive indices of for the second wedge 50. It is important to note that the upper ray 84 and the lower ray 86 are both spatially separated and divergent at exit surface 78. A lightwave with arbitrary polarization traveling in the forward direction 22 through the optical attenuator 20 becomes separated into three output rays Therefore, each output ray comprises a fraction of the total input power. The direct output ray 82 comprises a fraction of the input power equal to the $\cos^2(\theta_F + \theta_H)$ where $\theta_F$ equals the rotation angle imparted by the Faraday rotator 44, and $\theta_H$ equals the rotation angle imparted by the half wave plate 46. Values of $\theta_F$ and $\theta_H$ may be selected to suit a particular application so that power is appropriately divided between three output rays. Alternatively, setting $\theta_F = -\theta_H$ completely eliminates the spatially separated upper and lower output rays 84 and 86 so that all input power is transferred through the direct output ray 82.

Figure 4:
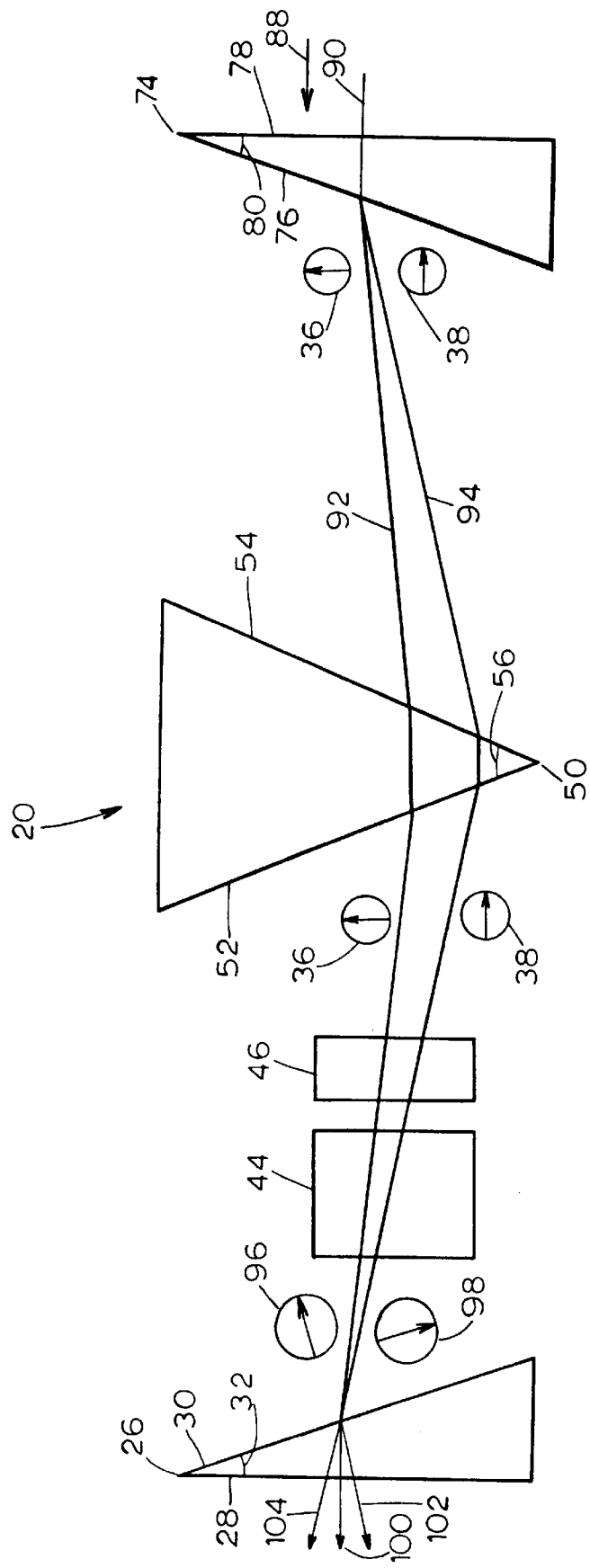
FIG. 4 is a functional diagram showing the propagation of an optical reflection through the first embodiment of the present invention.

Now referring to FIG. 4, a reflected lightwave 90, is traveling through the attenuator 20 in a reverse direction 88. The lightwave 90 impinges on the third exit surface 78 and passes through the body of the third wedge 74. As the lightwave 90 crosses the third entrance surface 76 of the third birefringent wedge 74 it separates a seventh light ray 92 having the first polarization vector 36, and an eighth light ray 94 having the second polarization vector 38. The seventh and eighth rays 92 and 94 impinge on the second exit surface 54 and pass through the body of the second wedge 50 and out the second entrance surface 52. The rays are not further separated by the second birefringent wedge 50 because their polarization vectors are suitably aligned with its optical axis.

The seventh and eighth rays 92 and 94 pass through the halfwave plate 46 which imparts a polarization rotation of $-\theta_H$ and the rotator 44 which imparts a polarization rotation of $\theta_F$ for a total polarization rotation of $(\theta_F-\theta_H)$. The seventh ray 92 now has a fifth polarization vector 96 and the eighth ray 94 has a sixth orthogonal polarization vector 98. Thus, the seventh and eighth rays 92 and 94 each have polarization vectors composed of both the first and second polarization vectors 36 and 38.

The seventh and eighth rays 92 and 94 converge at the first exit surface 30 of the first wedge 26. The first birefringent wedge 26 separates each ray into its component parts having the first and second polarization vectors 36 and 38. The component of the seventh ray 92 having the first polarization vector 36 and the component of the eighth ray 94 having the second polarization vector 38 combine to form a direct reflected ray 100. The component of the seventh ray 92 having the second polarization vector 38 and the component of eighth ray 94 having the first polarization vector 36 diverge and become an upper reflected ray 104 and a lower reflected ray 102 respectively. The divergence angle between the upper reflected ray 104 and the lower reflected ray 102 is equal to the difference between the two indices of refraction for the first wedge 26 multiplied by the first apex angle 32.

The fraction of power transferred from the reflected lightwave 90 to the upper and lower reflected rays 104 and 102 is equal to $\sin^2(\theta_F-\theta_H)$. Thus, all reflected lightwaves can be diverted to the upper and lower rays by setting $\theta_F-\theta_H=90°$. Alternatively, values for $\theta_F$ and $\theta_H$ may be selected to suit a particular application so that power from reflected lightwaves is appropriately divided between the upper reflected ray 104, the direct reflected ray 100, and the lower reflected ray 102.

In sum, the isolator 20 can be used to divide and apportion the power from a single lightwave transmission between three spatially separate lightrays, and to provide a variable level of attenuation to a direct reflected lightwave incident on the transmission device's aperture. Substantially complete isolation from reflective lightwaves is achieved by satisfying $\theta_F-\theta_H=90°$. Under this condition all reflected lightwaves will follow the divergent paths of the upper and lower reflected rays 104 and 102. These divergent rays ideally avoid the aperture of the optical transmitting device. The amount of attenuation for the direct reflected ray 100 may be selected by choosing an appropriate value for $\theta_F-\theta_H<90°$.

The entire transmitted lightwave can be passed in the forward direction through attenuator 20 and output as a single ray by selecting $\theta_F+\theta_H=0°$. Alternatively, the transmitted lightwave can be divided and apportioned between three spatially separated output rays by choosing an appropriate value for $\theta_F+\theta_H>0°$. For example, selecting $\theta_F=45°$ and $\theta_H=45°$ yields a single output ray and substantially complete spatial divergence of all reflected lightwaves.

Those skilled in the art will recognize that the attenuator 20 provides an exceptionally high degree of application flexibility because the condition $\theta_F+\theta_H>0°$ can be satisfied independently of $\theta_F-\theta_H=90°$ which provides that a condition of substantially complete isolation can be maintained for a wide-range of desired lightray spitting conditions at the output.

The present invention can be easily adapted to a variety of industrial and commercial laser applications such as fiber optics, micro-optics, phase conjugate mirror (PCM) loops, and ring resonators. Experiments have shown that it may also work to minimize crosstalk between holographic images that have been recorded on orthogonal components of a single lightwave.

Further modifications may be made to the present invention that improve isolation and increase signal bandwidth. For example, FIG. 5 and FIG. 6 show a two-stage polarization insensitive Faraday attenuator based on an expansion of invention described above. The embodiment shown in FIG. 5 and FIG. 6 includes an additional Faraday attenuator and an additional half wave plate.

As shown in FIG. 5, a forward traveling lightwave transmission propagates along the optical path as before except the four spatially separated, orthogonally polarized light rays traveling towards the third wedge pass through an additional Faraday rotator and half wave plate. As a result, the lightrays entering the third wedge each comprise polarization components in both of the orthogonal polarization directions that are aligned with the optical axes of the wedges. Thus, the birefringent property of the third wedge causes the upper, the lower, and the direct output rays to further separate into orthogonally polarized pairs of divergent rays. Variation of the rotation angles $\theta_{F1}$, $\theta_{H1}$, $\theta_{H1}$, and $\theta_{H2}$ can produce up to six useful output light rays.

As shown in FIG. 6, a reverse traveling (reflected) lightwave may undergo additional spatial separations as a result of the second Faraday attenuator and half wave plate. These separations are similar to the those produced in the forward traveling lightwave signal. Variation of the rotation angles $\theta_{F1}$, $\theta_{H1}$, $\theta_{H1}$, and $\theta_{H2}$ can produce up to six spatially separate reflected rays. The additional spatial divergence of the reflected lightrays provides improved isolation.

Those skilled in the art will recognize that the two-stage embodiment discussed above may be useful in beam splitting, or commercially promising optical multiplexing applications with enhanced isolation characteristics.

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A polarization insensitive optical attenuator, comprising:

a first birefringent wedge disposed along an optical path;

a second birefringent wedge disposed along said optical path after said first birefringent wedge;

a third birefringent wedge disposed along said optical path after said second birefringent wedge;

a first non-reciprocal optical rotator disposed along said optical path between said first birefringent wedge and said second birefringent wedge; and a first reciprocal optical rotator disposed along said optical path adjacent to said non-reciprocal rotator;

wherein the distance between said first birefringent wedge and said second birefringent wedge divided by the distance between said second birefringent wedge and said third birefringent wedge approximately equals the apex angle of said third birefringent wedge divided by the apex angle of said first birefringent wedge, and wherein the optical axes of the first wedge, the second wedge, and the third wedge are substantially parallel.

2. The optical attenuator of claim 1, wherein the first, second, and third wedges are made from a birefringent crystal material.

3. The optical attenuator of claim 1, wherein the non-reciprocal optical rotator is a Faraday rotator.

4. The optical attenuator of claim 1, wherein the reciprocal rotator is made from a birefringent or an optically active crystal material.

5. The optical attenuator of claim 1, wherein the second wedge has an apex angle substantially equal to the sum of the apex angle of the first wedge plus the apex angle of the third wedge.

6. The optical attenuator of claim 1, further comprising;
 a second non-reciprocal optical rotator disposed along said optical path between said second birefringent wedge and said third birefringent wedge;
 a second reciprocal optical rotator disposed along said optical path adjacent to said second non-reciprocal rotator.

7. The optical attenuator of claim 6, wherein the second wedge has an apex angle substantially equal to the sum of the apex angle of the first wedge plus the apex angle of the third wedge.

8. The optical attenuator of claim 6, wherein the optical axes of the first wedge, the second wedge, and the third wedge are parallel.

9. The optical attenuator of claim 6, wherein the first, second and third wedges are made from a birefringent crystal material.

10. The optical attenuator of claim 6, wherein the second non-reciprocal optical rotator is a Faraday rotator.

11. The optical attenuator of claim 6, wherein the second reciprocal rotator is made from a birefringent or an optically active crystal material.

* * * * *